United States Patent
Bendjellal et al.

(12)

(10) Patent No.: US 11,312,271 B2
(45) Date of Patent: Apr. 26, 2022

(54) CHILD SAFETY SEAT

(71) Applicant: Britax Römer Kindersicherheit GmbH, Leipheim (DE)

(72) Inventors: Farid Bendjellal, Rueil-Malmaison (FR); Michael Fürstenberg, Ulm (DE)

(73) Assignee: Britax Romer Kindersicherheit GmbH, Leipheim (DE)

( * ) Notice: Subject to any disclaimer, the term of this patent is extended or adjusted under 35 U.S.C. 154(b) by 51 days.

(21) Appl. No.: 16/794,749

(22) Filed: Feb. 19, 2020

(65) Prior Publication Data
US 2020/0269732 A1    Aug. 27, 2020

(30) Foreign Application Priority Data

Feb. 22, 2019  (EP) ..................................... 19158831

(51) Int. Cl.
B60N 2/28    (2006.01)
(52) U.S. Cl.
CPC ......... *B60N 2/2893* (2013.01); *B60N 2/2821* (2013.01); *B60N 2/2869* (2013.01); *B60N 2/2887* (2013.01)
(58) Field of Classification Search
CPC ..... B60N 2/2893; B60N 2/2887; B60N 2/289
See application file for complete search history.

(56) References Cited

U.S. PATENT DOCUMENTS 5,466,044 A * 11/1995 Barley ................. B60N 2/2821
                                                          297/252
5,487,588 A *  1/1996 Burleigh ............. B60N 2/2806
                                                          297/250.1
10,150,389 B2* 12/2018 Cohen ................. B60N 2/2809
(Continued)

FOREIGN PATENT DOCUMENTS

EP    0703113 A2 *  3/1996 ........... B60N 2/2827
EP    3023293 A1    5/2016
(Continued)

OTHER PUBLICATIONS

European Search Report European application No. 19158831.8 dated Jul. 31, 2019, all pages cited in it's entirety.

*Primary Examiner* — David R Dunn
*Assistant Examiner* — Tania Abraham
(74) *Attorney, Agent, or Firm* — K&L Gates LLP

(57) ABSTRACT

The invention relates to a child safety seat (100) comprising at least a first (104), a second (104) and a third locking mechanism (106) each being adapted for releasably locking the seat (100) to a vehicle at a respective anchorage point, wherein the anchorage points of the first locking mechanism (104) and the second locking mechanism (104) are arranged on a line, the anchorage point of the third locking mechanism (106) being spaced apart from the line a seat surface (101) of the seat (100), the seat surface (101) providing a sitting area of the seat (100), the third locking mechanism (106) being adjustable in height relative to the seat surface (101) and a coupling member (202), the third locking mechanism (106) being secured to the seat (100) via the coupling member (202), the coupling member (202) being height adjustable to enable the height adjustability of the third locking mechanism (106).

19 Claims, 9 Drawing Sheets

(56) References Cited

U.S. PATENT DOCUMENTS

Figure 1:
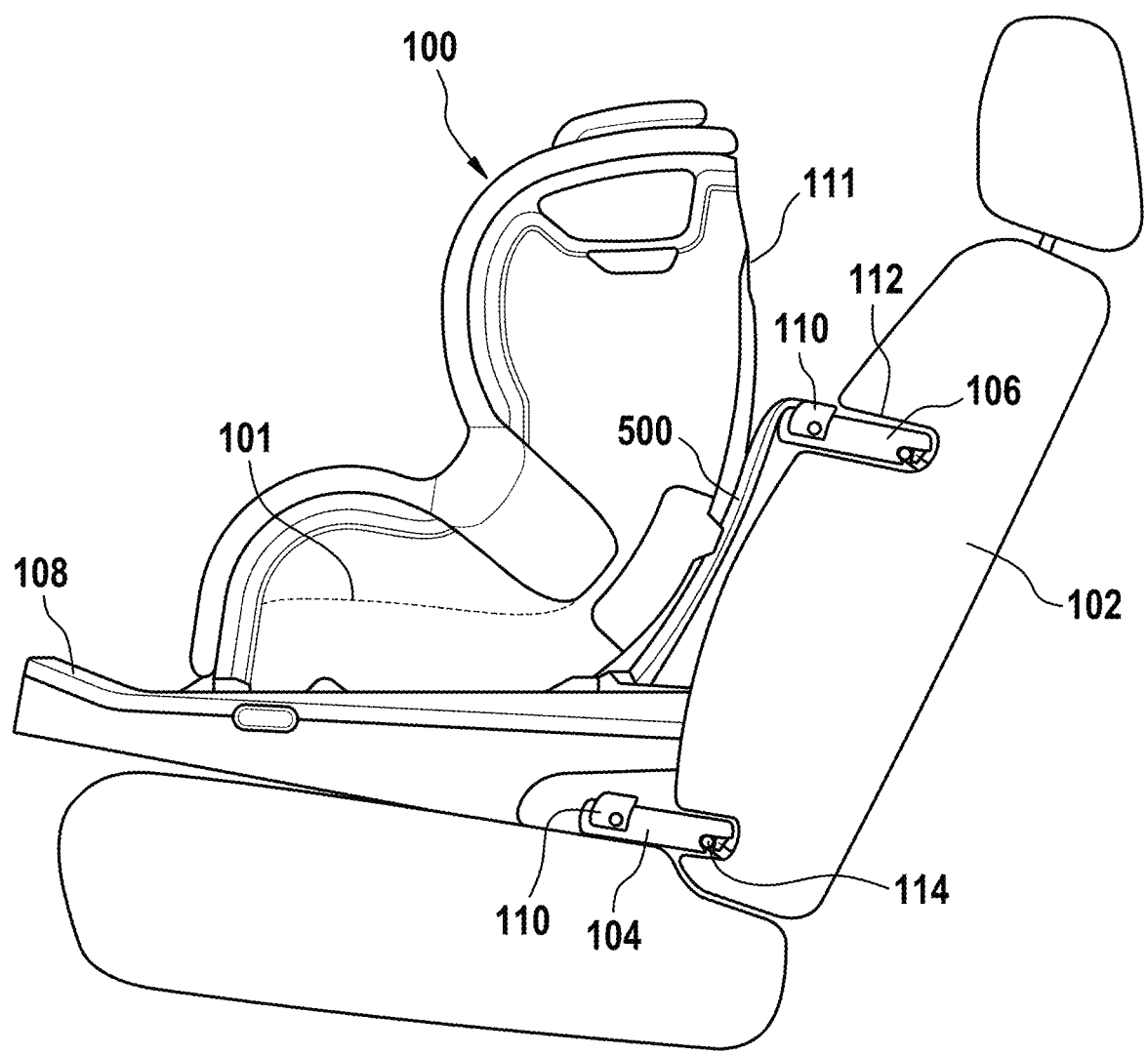

2008/0303321 A1* 12/2008 Powell ................ B60N 2/2845
297/216.11
2008/0315647 A1* 12/2008 Carine ................ B60N 2/2884
297/250.1
2011/0233374 A1* 9/2011 Clement .............. B60N 2/2824
248/542
2018/0079331 A1* 3/2018 Williams ............. B60N 2/2812

FOREIGN PATENT DOCUMENTS

| FR | 2814994 A1 | 4/2002 | |
|----|------------|--------|----|
| FR | 2870487 A1 | 11/2005 | |
| WO | WO-2005039921 A1 * | 5/2005 | ............. B60N 2/286 |

* cited by examiner

CHILD SAFETY SEAT

Disclosed is a child safety seat and a system comprising a vehicle and a child safety seat.

Child safety seats are secured to vehicles through different systems. One system is the three-point belt, which has a seatbelt tongue that can be inserted into a buckle positioned in the car and which is typically fixed to the child safety seat at various points. Another possibility is given by the ISOFIX system, which is an international standard for attachment points for child safety seats in passenger cars. The principle of the ISOFIX connection is a locking mechanism which has a hook trap "ISOFIX attachment" for releasably locking the seat to a respective bar "anchorage" that is fixed to the vehicle. The ISOFIX system uses two respective locking mechanisms typically having a center-to-center distance between the respectively used hooks of 280 mm. The "anchorage" means one 6 mm diameter rigid round horizontal bar, extending from vehicle or seat structure to accept and restrain an ISOFIX Child Restraint System with ISOFIX attachments.

SUMMARY

Disclosed is a child safety seat comprising at least a first, a second and a third locking mechanism, each being adapted for releasably locking the seat to a vehicle at a respective anchorage point, wherein the anchorage points of the first locking mechanism and the second locking mechanism are arranged on a line, and the anchorage point of the third locking mechanism is spaced apart from the line. The child safety seat further comprises a seat surface of the seat, the seat surface providing a seating area of the seat. It is within the scope of the invention that the third locking mechanism is adjustable in height relative to the seat surface. Further, the child safety seat comprises a coupling member, the third locking mechanism being secured to the seat via the coupling member, the coupling member being height adjustable to enable the height adjustability of the third locking mechanism.

Embodiments may have the benefit that child safety seats can be secured to vehicles in a very safe manner because of the usage of the three anchorage points spaced apart from each other. In case of a crash, a rotation of the seat about a single axis or line may thereby be avoided due to the three anchorage points.

It has to be noted that generally the vehicle may be any vehicle which may carry the child safety seat, including cars, trucks, boats, trains or airplanes. Typically, the child safety seat may be attached to a seat of the vehicle which comprises the respective three anchorage points. For example, the first and the second locking mechanisms are making use of or are based on the conventional ISOFIX locking mechanism (or ISOFIX attachments), adapted to engage with the respective anchorage points which are arranged on a line behind the area of the inflection point in which the seat surface of the vehicle seat merges with the seat backrest of the vehicle seat on which the child safety seat is to be installed.

Generally, the first, second and third locking mechanisms may be identical. Therefore, any further discussions made with respect to the third locking mechanism may also apply analogously to the first and second locking mechanisms and vice versa. However, the third locking mechanism may be different from the first and second locking mechanisms. The third locking mechanism may be a type of locking mechanism to stiffly, rigidly and releasably fix a child safety seat to a vehicle seat.

It further has to be noted that for the ISOFIX system the anchorages are typically 6 mm diameter transverse horizontal rigid bars which cover two zones of 25 mm minimum effective length located on the same axis. In this example, the anchorage points of the first locking mechanism and the second locking mechanism are arranged on the line provided by this axis.

In accordance with the invention, the child safety seat further comprises a seat surface of the seat, the seat surface providing a seating area of the seat. For example, the above-mentioned line may run below the seat surface. In a further example, the child safety seat further comprises a backrest and a supporting base, the supporting base supporting the seat surface and the supporting base or the backrest comprising the third locking mechanism.

It is possible that the third locking mechanism provides a stiff and rigid coupling of the child safety seat to the vehicle seat on which the child safety seat is to be mounted, i.e., installed using the first, second and third locking mechanisms. It may be assumed that in the future, the mechanical stability of vehicle seats that are available to accommodate adult passengers will be enhanced up to the scenario in which the vehicle seats themselves comprise the vehicle seatbelt, for example the three-point seatbelt. The integration of the vehicle seatbelt into the seat may be of significant relevance in the case of autonomous or automated vehicles and automated driving, where passenger orientation in the direction of vehicle movement may not be necessary anymore the vehicle can drive by itself, and any passengers in the vehicle may be oriented in an arbitrary direction since there is no need anymore to control or "drive" the vehicle as in the past.

Further, the third locking mechanism is adjustable in height relative to the seating surface. This may have the benefit that the conventional attachments (e.g., from the ISOFIX system) using the first and second locking mechanisms can remain unchanged while, depending on the size of the child safety seat and the width of the vehicle seat to which the child safety seat is to be attached, the third locking mechanism can be adjusted in height in a flexible manner.

In addition, the child safety seat further comprises a coupling member, the third locking mechanism being secured to the child safety seat via the coupling member, the coupling member being height adjustable to enable the height adjustability of the third locking mechanism. The coupling member may be a stiff and rigid coupling member. Further, the third locking mechanism may be pivoted to the coupling member. For example, the third locking mechanism is pivoted to the coupling member. For example, the coupling member comprises an axis, and the third locking mechanism is pivoted to the shell of the child safety seat by the axis. The provision for the possibility of pivoting the third locking mechanism may have the benefit of simplifying installation of the child safety seat in the vehicle. For a safe installation of the child safety seat, there may be no need to exactly position the third locking mechanism relative in height with respect to the vehicle counterpart (typically an axis "anchorage point") to which the third locking mechanism is able to lock). Eventual inaccuracies in height positioning of the third locking mechanism may therefore be easily compensated for by means of pivoting the third locking mechanism relative to the coupling member.

In accordance with an embodiment, the anchorage point of the third mechanism is centered with respect to the width of the child safety seat. This may have the benefit that in the case of a crash, forces acting on the child safety seat are equally distributed over the seat. This may minimize the risk that during a crash one side of the seat is subjected to greater stress than the other side due to lifting forces that may exist in case of a non-centered arrangement of the third locking mechanism with respect to the width of the child safety seat.

In accordance with an embodiment, the third locking mechanism is adapted for enabling the releasable locking of the child safety seat to the vehicle in a functioning position of the third locking mechanism, the pivoting of the third locking mechanism being such that the third locking mechanism can be pivoted between the functioning position and a resting position, wherein in the resting position of the third locking mechanism is received within the shell of the seat. The third locking mechanism may be arranged at the height of the center of gravity+/−10 cm of the child seat. For example, in the resting position the third locking mechanism is received within the backrest itself. The third locking mechanism may be received in the supporting base alternatively or additionally. This may have the benefit that in case the child safety seat is used in vehicles that have no counterpart for locking the third locking mechanism to the vehicle, the child safety seat may nevertheless be used without the risk that, due to the presence of the third locking mechanism protruding from the child safety seat, the child safety seat damages the vehicle seat on which the child safety seat is to be installed. Further, while hand-carrying of the child safety seat, risk of injury due to protruding parts of the third locking mechanism is minimized.

In accordance with an embodiment, the coupling member is an elongate component pointing downwards from the seat surface, wherein for example the elongate component is pivoted to the supporting base. The term "downwards" is understood as pointing away from the seating surface of the child safety seat in a direction that is on a side of the seating surface opposite the head area of the child safety seat. This may have the benefit that in case of an installation of the child safety seat on a vehicle seat, a fixation of the child safety seat to the front face area of the vehicle seat is possible in a convenient manner. At any time, the third locking mechanism is accessible from the front side of the vehicle seat (knee or foot area of the seat) for releasably locking the locking mechanism to the vehicle. In other words, this could ensure that the third locking mechanism is accessible at all times from the footwell of the vehicle seat so that the third locking mechanism can be conveniently operated. Again, due to the fact that the elongate component is pivoted to the supporting base, a convenient flexibility may be given to the user when installing the child safety seat in the vehicle since small differences in height between the third locking mechanism and the respective vehicle's fixed counterpart may be compensated for easily.

In accordance with an embodiment, the child safety seat further comprises a guiderail, the third locking mechanism being secured to the child safety seat via the guiderail and the guiderail being adjustable in length. By means of such a guiderail, the distance between parts of the child safety seat and the vehicle seat on which the child safety seat is to be installed may be varied freely. For example, if the backrest inclination of the vehicle seat on which the child safety seat is to be installed can be varied, the different backrest inclination can be taken into account via a distance variation in the guiderail without having to change the position of the child safety seat itself.

For example, due to the guiderail's adjustability in length, the spacing between the backrest of the child safety seat and the anchorage point of the third locking mechanism is adjustable in case the backrest comprises the third locking mechanism. It has to be noted here that one may denote this spacing as "dorsal" spacing since from an anatomical point of view of a child being seated in the child safety seat, the dorsal spacing is the spacing behind the child's back between the backrest and the anchorage point on the back side of the child safety seat.

In a further example, due to the guiderail's adjustability in length, the spacing between the backrest of the child safety seat and the anchorage point of the third locking mechanism is adjustable in case the supporting base comprises the third locking mechanism. The latter spacing may be considered "ventral" spacing between the backrest and the anchorage point since the term ventral refers to the front side of the child (the direction pointing away from the child's chest) that is to be seated in the child safety seat, i.e., it refers to a direction facing away from the front side of the child.

In accordance with an embodiment, the guiderail is a telescopic rail, wherein more particularly it comprises a first and a second rail engaging each other, the first rail being attached to the child safety seat, e.g., via the coupling member, and the third locking mechanism being pivoted to the second rail, wherein the first and the second rail comprise multiple opposing latching elements. The usage of a telescopic rail may have the benefit that in a space-saving manner, a large variability in guiderail length can be implemented in the child safety seat. In a sense, a compact and highly flexible positioning of the child safety seat in the vehicle may be possible.

For example, the third locking mechanism is pivoted to the guiderail, e.g. by an axis. For example, the third locking mechanism is mounted on the guiderail in such a manner that it can be tilted relative to the guide rail. This may provide additional flexibility in using the third locking mechanism when installing the child safety seat in the vehicle since, due to the pivoting of the third locking mechanism to the guiderail, different height positions of the respective vehicle counterpart to which the third locking mechanism is to be locked can be accounted for. The same holds with respect to different backrest inclinations of the seat on which the child safety seat is to be installed in the vehicle.

In accordance with an embodiment, the third locking mechanism comprises a hook trap for releasably locking the child safety seat to the vehicle. The principle of a hook trap is as follows: when moving toward a corresponding crossbeam or bar located in the vehicle at the respective anchorage point, the hook trap can first run diagonally upwards over the crossbeam and then, after the end of the hook has crossed the crossbeam, fall downwards 'into the lock'. The hook now ensures that it is no longer possible to remove the hook from the crossbeam without lifting the hook again using, e.g., a respective release mechanism.

In accordance with an embodiment, the child safety seat further comprises a release button adapted for releasing the locking of the third locking mechanism when the button is actuated. This is an example of such a release mechanism.

For example, the backrest of the child safety seat comprises a release button. For example, the release button may be comprised or contained in a sidewall of the backrest or it may be comprised or contained in an upper outer edge of the sidewall, e.g., centered with respect to the width of the seat. This may have the benefit that the operation of the release button is comfortable for a user.

In accordance with an embodiment, the child safety seat further comprises a rebound bar arranged at the supporting base, the foot end or the head end of the seat, the rebound bar being adapted for being fixed rigidly to the seat and for forming an abutment with respect to the vehicle above the seat surface, and comprising the third locking mechanism and the release button.

Generally, "rebound" is understood as the movement that occurs in response to the initial action of a crash; i.e., in the event of a crash, there are always two forces impacting on the child located in the child safety seat, the initial crash force and the subsequent rebound. The rebound bar is typically resting against the backrest of the vehicle seat when the child safety seat is installed on the vehicle seat. By means of the rebound bar, the rebound movement of the child safety seat is reduced in the event of a crash. Another benefit of the rebound bar is that in case of rear impact onto the vehicle in which the child safety system is installed, a rotation of the child safety seat to the rear direction is also controlled.

Since the rebound bar comprises the third locking mechanism and optionally the release button, this may be beneficial because no extra rigid connection means are required to attach the third locking mechanism to the child safety seat. Due to the purpose of the rebound bar to prevent a rebound of the child safety seat in case of a crash, the rebound bar is typically made very mechanically stable and rigid and therefore provides a decent attachment point for the third locking mechanism.

In accordance with an embodiment, the rebound bar is arranged on the seat so as to be rotatable about an axis and be releasably fixable in a plurality of positions, wherein more particularly the release button is further adapted to release the fixing of the rebound bar when actuated (fixing of the rebound bar in a desired rotational position). For example, the rebound bar may be inclined with respect to the seating surface of the child safety seat such that it is adapted to the inclination of the backrest of the vehicle seat on which the child safety seat is to be installed. By means of the adjustable inclination of the rebound bar, it is possible to take various inclinations of vehicle seat backrests into account and to minimize or avoid any distance between the rebound bar and the backrest of the vehicle seat on which the child safety seat is to be installed. Since the release button is adapted to both releasing the fixing of the rebound bar and the third locking mechanism, easy removal of the child safety seat from the vehicle is possible, thereby minimizing the number of required manipulations. After the rebound bar is adjusted regarding its inclination as desired, the release button may be used to fix the rebound bar to this inclination angle. The release button may be for example a button that releases the fixation while the button is being operated and that leads to a fixation of the rebound bar to its desired position when the button is released again. Thus, the rebound bar can be adjusted to the backrest of the vehicle seat.

For example, the release button has a child lock adapted to prevent operation of the release button by the child. This may be especially helpful in case the rebound bar is arranged at the foot end of the seat, i.e., in case the child safety seat is to be installed with the child being oriented in the vehicle in a rearward direction. In this case, the child may unintentionally have access to the release button when facing the rebound bar and thus the release button. The child lock may prevent unwanted operation of the release button. The child lock may be provided in different manners; e.g., it might foresee specific force requirements for operation such that the release button may only be operated by an adult but not by an child because the child does not have the strength to operate the release button. Other possibilities include the usage of a child lock which can only be operated by simultaneously performing two independent unlock operations, such as the necessity to operate or move a safety button before being able to operate the release button itself, etc.

In accordance with an embodiment, the elongate component comprises the release button, the release button being arranged on the elongate component for being operable from the side of the elongate component facing away from the line on which the anchorage points of the first and second locking mechanism are arranged. This may have the benefit that the release button is operable in a very convenient manner. In case the elongate component is on the supporting base pointing downwards, the third locking mechanism may engage with a respective counterpart of the vehicle that is located below the seating surface provided by the vehicle seat on which the child safety seat is to be installed. Since the release button is arranged on the elongate component for being operable from the side of the elongate component facing away from the line, an operation of the release button from the front and the foot well of the vehicle seat on which the child safety seat is to be installed may be possible in a convenient manner.

In another aspect, the invention relates to a system comprising a vehicle and a child safety seat as described above. The vehicle has respective counterparts to which the first, second and third locking mechanisms may releasably lock. The above-described examples and embodiments may be combined freely as long as the individual examples and embodiments are not mutually exclusive.

The connection between the third locking mechanism and the rigid structure of the child safety seat may be either rigid or soft. For example, the third locking mechanism may be fixed to the structure of the child safety seat via either a strap or the above-described coupling member, elongate component and/or guiderail, each optionally via respective optional pivoting elements.

It has to be noted that any of the above-described locking mechanisms may comprise sensors or indicators for informing a user of the child safety seat (i.e., the adult) on correct or insufficient installation. For example, a color indicator may be provided on the locking mechanisms, which indicates for example in red and green whether the respective locking mechanism is correctly engaged with the respective counterpart of the vehicle seat. Either via wireless or wired communication connections, the locking mechanisms may also communicate their locking state or installation state (correct/insufficient) to a vehicle electronic system or to a mobile telecommunication device that runs a respective monitoring application. In either case, a user of the vehicle in which the child safety seat is installed can be informed about a correct/incorrect, sufficient/insufficient installation of the child safety seat.

It has to be noted that instead or additionally to the color indicator other indicator means may be used including an acoustic or haptic indicator. An acoustic indicator may provide a sound like a "click" or another signal tone, indicating a correct installation state or locking state.

It may also be possible that various components of the child safety seat are communicatively coupled to a collision avoidance system of the vehicle. A collision avoidance system is also known as a pre-crash system, forward collision warning system or collision mitigation system, designed to autonomously take action to reduce the severity of a collision in case a collision cannot be avoided. Typically, collision avoidance systems or pre-crash systems autonomously operate car brakes, close windows, pre-tension safety belts, bring backrests of passenger seats to an upright position, etc.

For example, given a height adjustability of the third locking mechanism via the coupling member or a length adjustability via the guiderail, the signal of an immediately impending crash (pre-crash signal) may be used to adjust the position of the child safety seat relative to the vehicle seat on which the child safety seat is installed. For example, the length and/or height adjustability of the third locking mechanism may be used to pull the child safety seat tighter and closer to the vehicle seat. This may minimize the spring effect due to the typically soft surface of the vehicle seat on which the child safety seat is installed and thus also minimize the respective rebound that partially occurs due to the spring effect during the crash. In another example, the height and length adjustability of the third locking mechanism may be used to rotate the seating surface of the child safety seat around the line formed by the anchorage points of the first and second locking mechanisms.

In case the child safety seat is mounted in the vehicle in a forward-facing direction, this leads to a backward tilting of the child to be accommodated in the child safety seat. As a consequence, this increases the angle between the road surface on which the vehicle moves and the seat surface of the child safety seat. Forces acting on a child in the seat are therefore concentrated more on the child's torso, and the danger of a tilting movement of the child's head during the crash can be minimized. In the event that the discussed seat inclination of the child safety seat can be adjusted by means other than the adjustable third locking mechanism, these other means can also be controlled by the pre-crash signal that is communicated in the event of an unavoidable crash to move the seat to a certain desired position. Generally, the rotation of the seat backwards may minimizing both head excursion and loads acting on child.

In another example, in case the child safety seat is installed in rear facing mode in the vehicle (child to be accommodated in the seat facing in rearward direction of the vehicle), the length and/or height adjustability of the third locking mechanism may be used based on the signal indicating an immediately impeding frontal impact onto the vehicle to rotate the seating surface of the child safety seat around the line formed by the anchorage points of the first and second locking mechanisms towards the back of the vehicle. This moves the face of the child farther away from the front side of the vehicle which may improve the protection of the child in the child safety seat.

This also holds true with respect to the first and second locking mechanisms, which may also be adjustable in height and/or length and which may analogously be controlled by the pre-crash signal, as discussed above with respect to the third locking mechanism.

Figure 2:
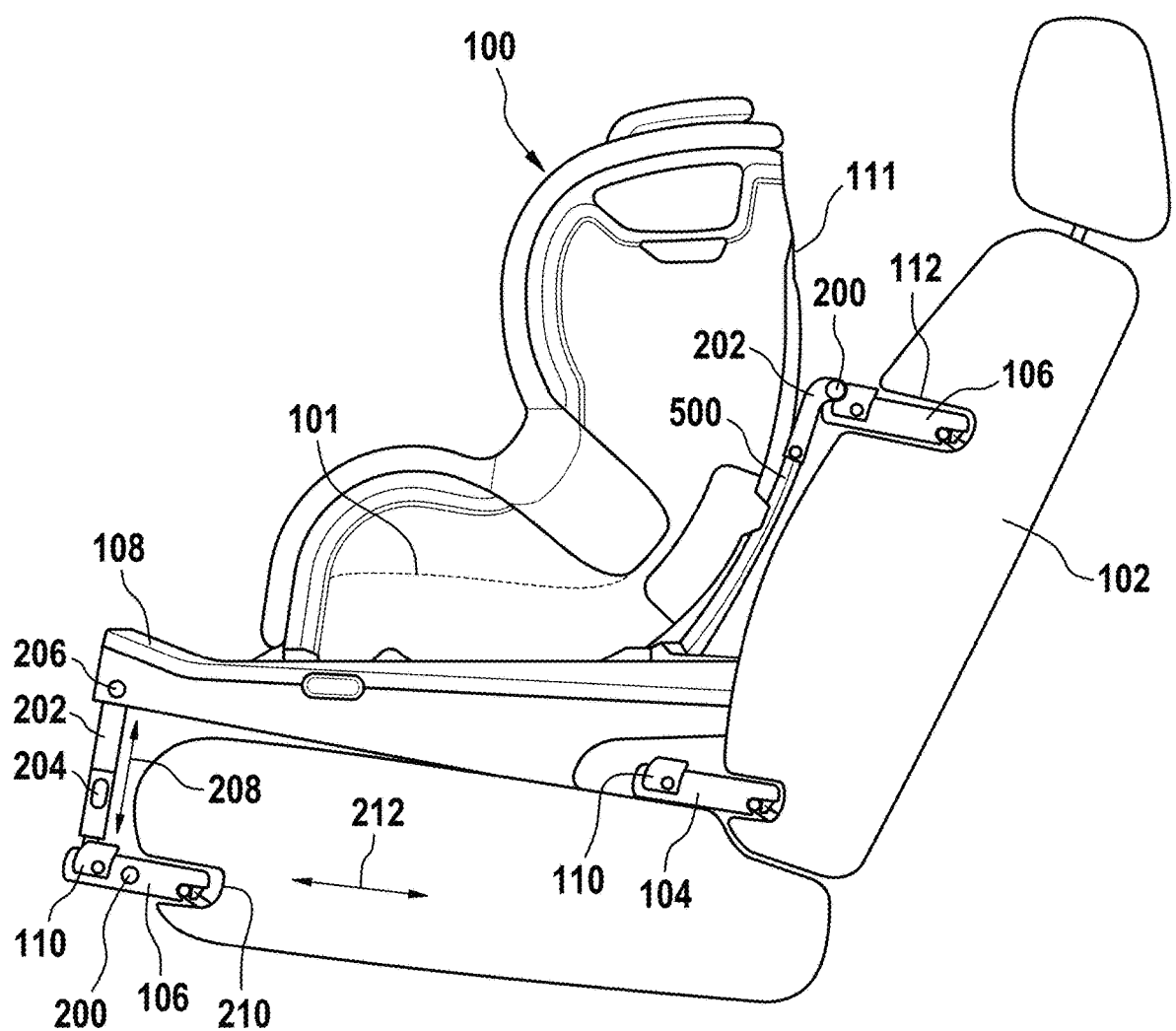
Figure 3:
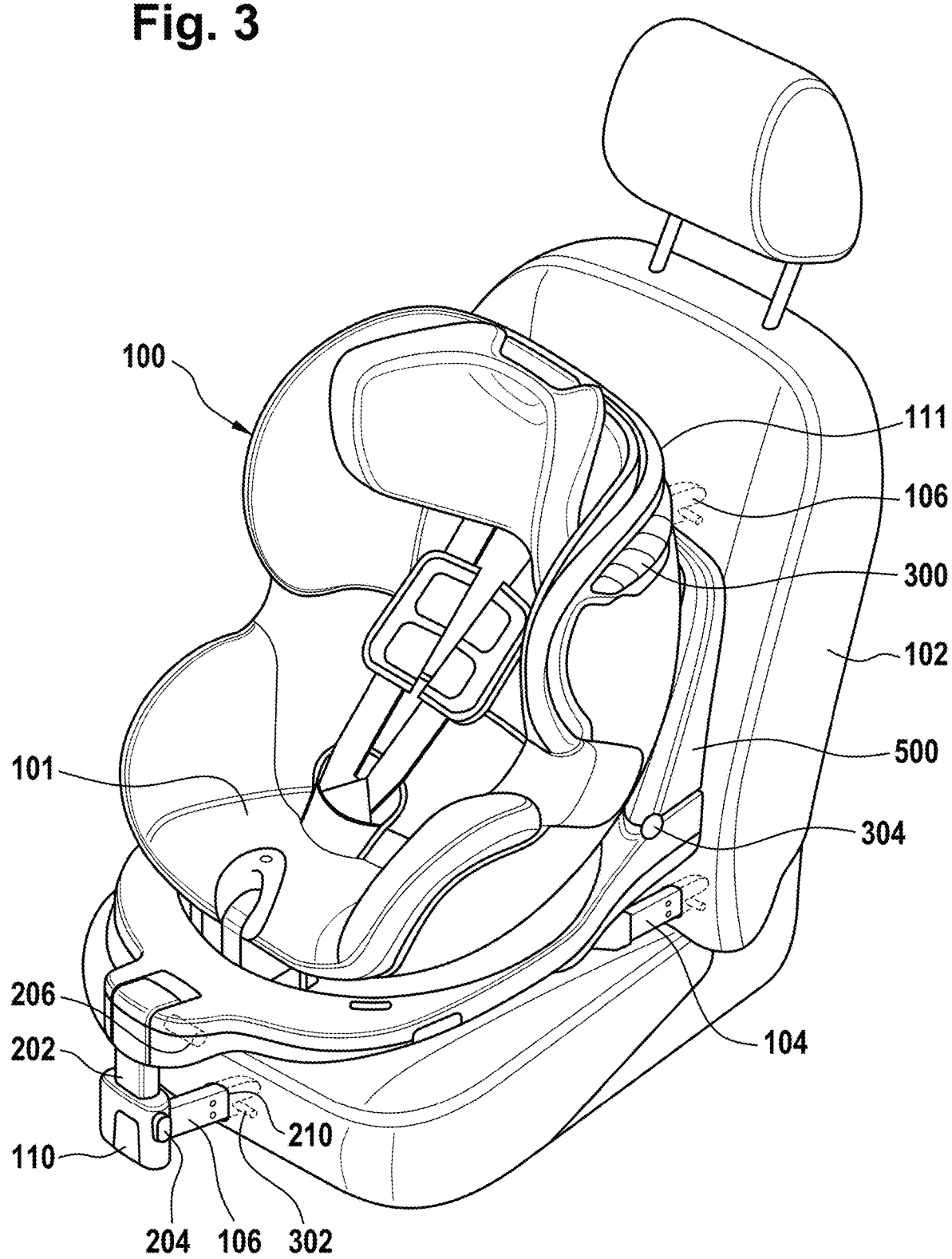
Figure 4:
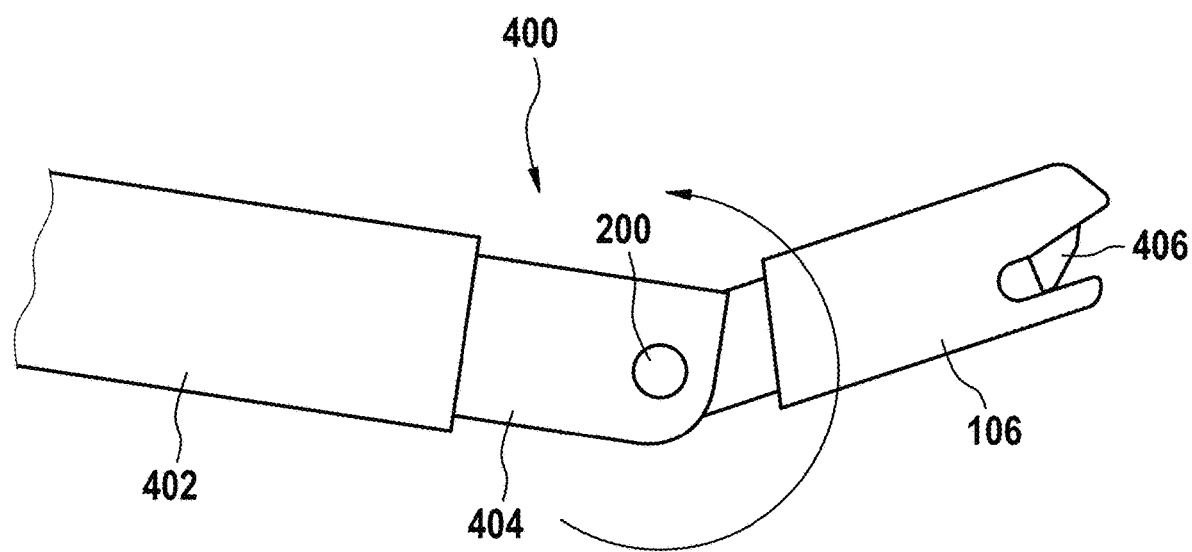
Figure 5:
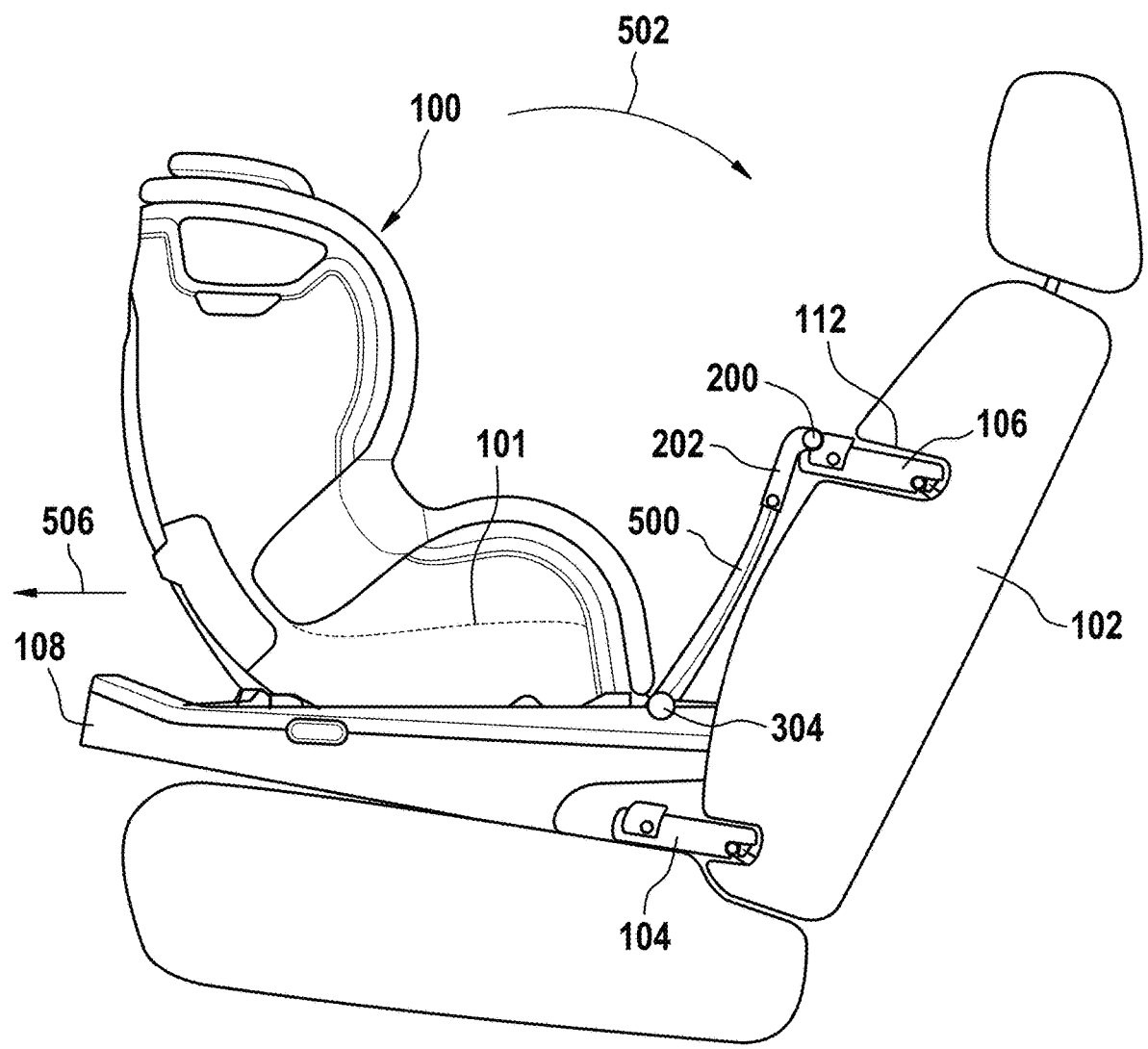
Figure 6:
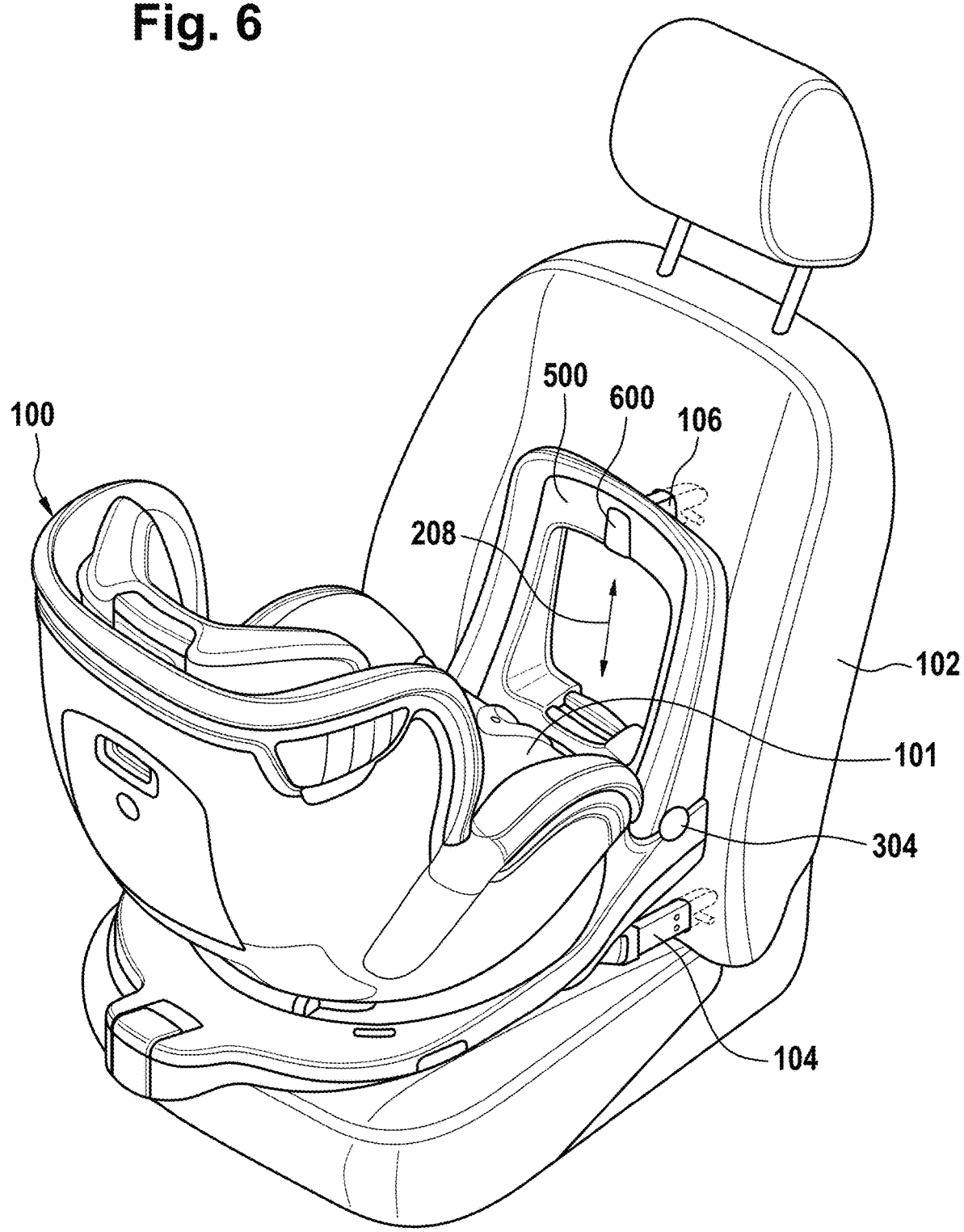
Figure 7:
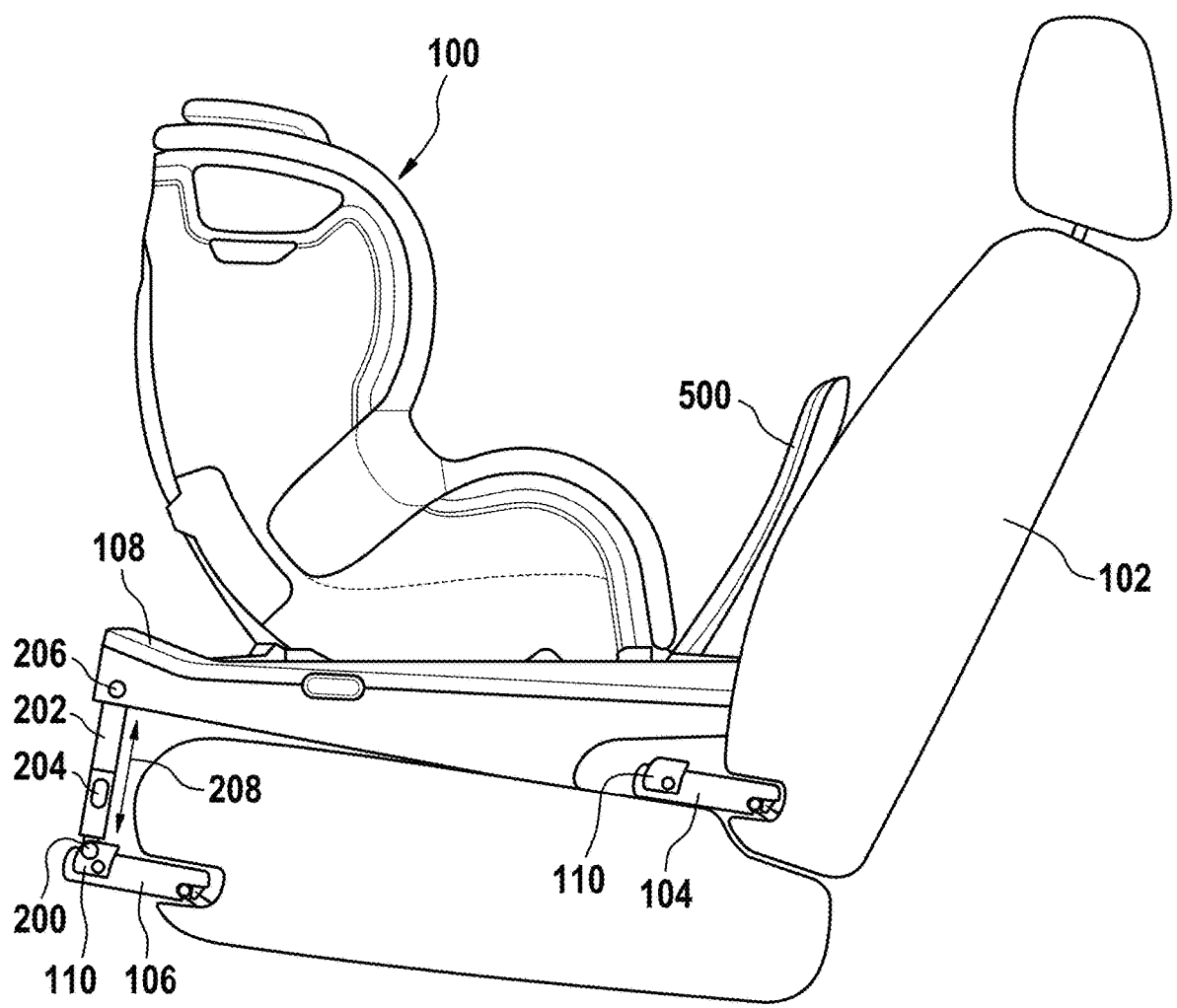
Figure 8:
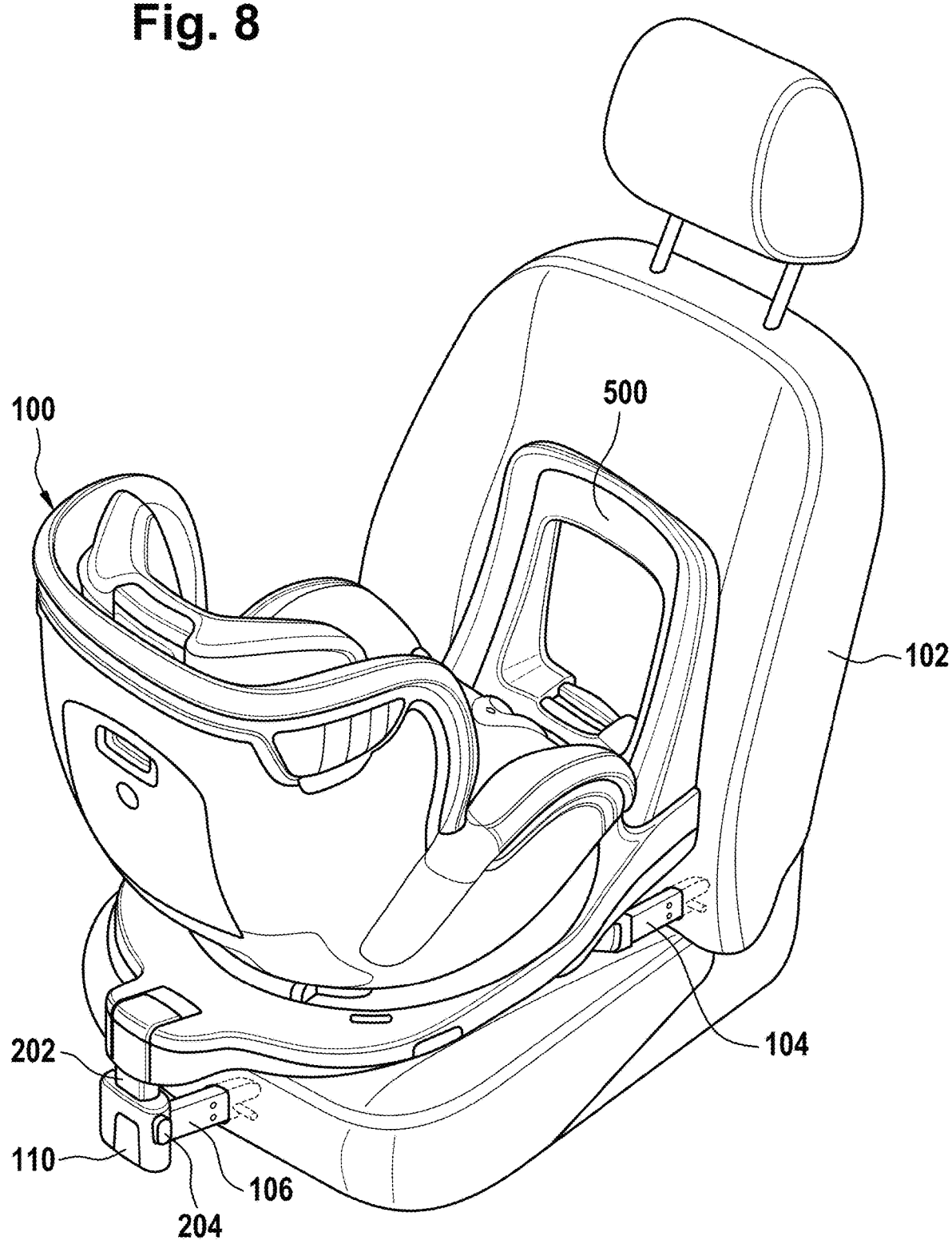
Figure 9:
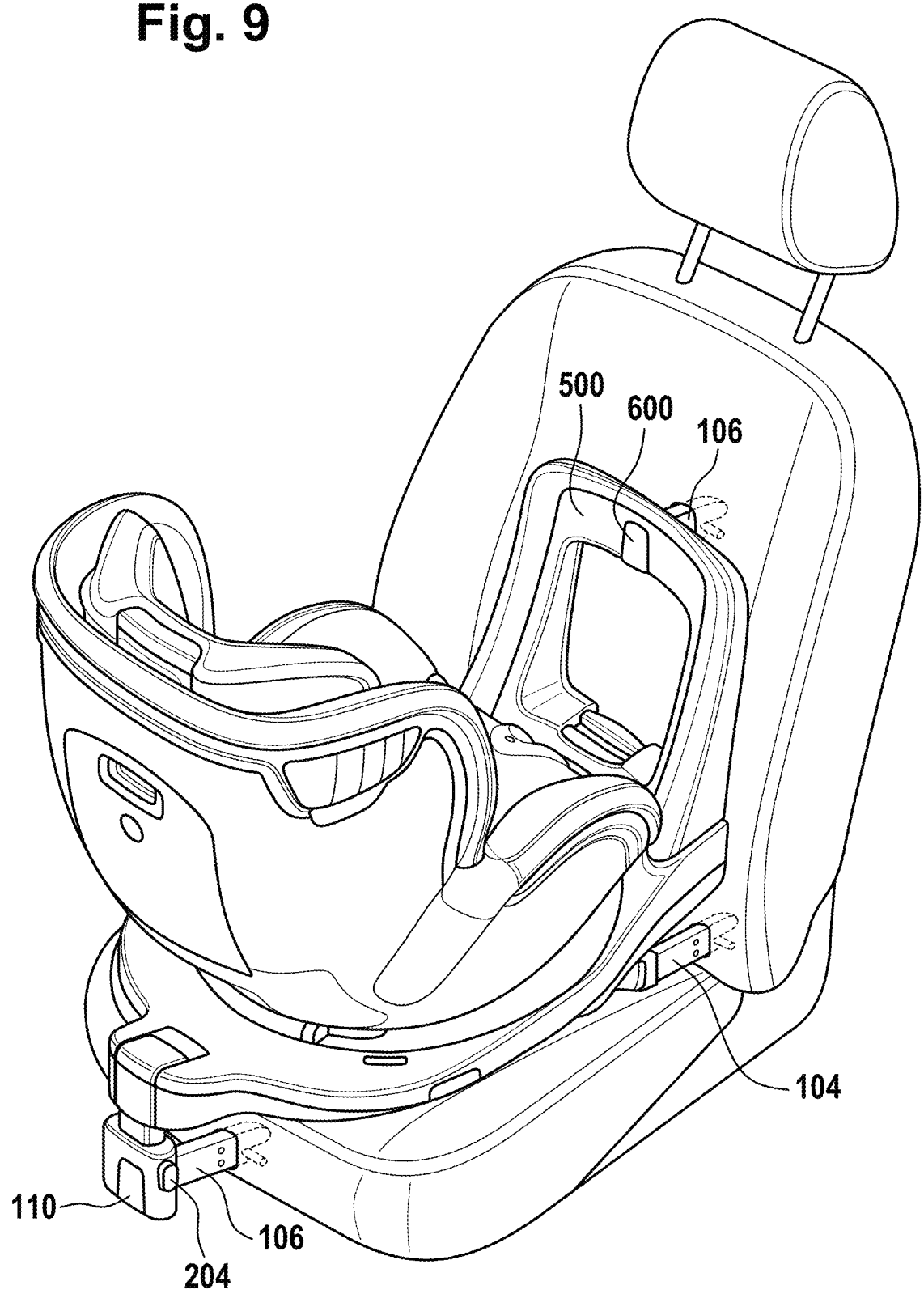

It further has to be mentioned that the principles discussed above with respect to the third locking mechanism may equally be applied to the first and second locking mechanisms. In the following, embodiments of the invention are described in greater detail in which:

FIG. 1 shows a schematic side view of a child safety seat installed in a forward-facing direction, FIG. 2 is a schematic side view of a child safety seat also installed in a forward-facing direction, FIG. 3 is a perspective view of the child safety seat of FIG. 2, FIG. 4 is a perspective view of a locking mechanism arranged on a guiderail, FIG. 5 is a schematic side view of a child safety seat installed in a rearward-facing direction, FIG. 6 is a perspective view of the child safety seat of FIG. 5, FIG. 7 illustrates a schematic side view of a further child safety seat installed in a rearward-facing direction, FIG. 8 is a perspective view of the child safety seat of FIG. 7, FIG. 9 illustrates a further perspective view of a child safety seat installed in a rearward-facing direction.

In the following, similar elements are denoted by the same reference numerals.

FIG. 1 is a schematic side view of a child safety seat 100 installed on a vehicle seat 102. The child safety seat in the present example is a newborn or infant car seat having a seating surface 101 (indicated by the dashed line) and a backrest 111. The seating surface and the backrest are mounted on a seat base 108. Further illustrated in FIG. 1 is an ISOFIX locking mechanism 104 that is installed on the seat base 108 on the left and right side (only right side currently visible) of the child safety seat 100. The anchorage point at which the ISOFIX locking mechanism locks the child safety seat 100 to the vehicle seat 102 is in the present example in the very lower end of the backrest of the vehicle seat 102.

The child safety seat 100 is installed in a forward-facing direction such that the back of the child to be accommodated in the seat and therefore the backrest 111 are pointing toward the backrest of the vehicle seat 102. The supporting base 108 has a rebound bar 500 extending from the supporting base 108 in an upward direction in between the backrest 111 of the child safety seat and the backrest of the vehicle seat 102. The rebound bar 500 is optional. The rebound bar 500 carries in the present example a locking mechanism 106 that may operate based on the same principles as the ISOFIX connectors 104. The backrest of the vehicle seat 102 has a recess 112 which comprises a counterpart portion, e.g., a locking bar, with which the locking mechanism 106 may engage. In case of engagement, the child safety seat 100 is locked to the vehicle seat 102 using the two ISOFIX connectors 104 and the locking mechanism 106. As indicated, the third locking mechanism 106 may be arranged at the height of the center of gravity+/−10 cm of the child seat 100.

It has to be noted that even though throughout the present disclosure the locking mechanism 104 is described as an ISOFIX locking mechanism, it is to be understood that any other type of locking mechanism to rigidly and releasably fix the child safety seat 100 to the vehicle seat 102 is also possible. Therefore, the designation of the locking mechanism 104 as "ISOFIX connection" is not to be considered and understood in a limiting manner.

The two ISOFIX locking mechanisms 104 provide for a locking of the child safety seat 100 to anchorage points that are arranged on a line 114, wherein in FIG. 1 this line is perpendicular to the drawing plane of FIG. 1. The locking mechanism 106 is spaced apart from that line 114, which has the effect that any rotational movement around the frictional axis 114 due to an acceleration of the child safety seat, for example due to a braking action of the vehicle in which the seat is installed, is prohibited.

A release button 110 may be provided on both the ISOFIX connectors 104 and the locking mechanism 106. By means of operation of the release button 110, the fixation of the ISOFIX connectors 104 and the locking mechanism 106 may be released.

FIG. 2 shows a side view of a child safety seat 100 which has a similar configuration as the child safety seat of FIG. 1. However, additionally, a locking mechanism 106 is shown at the foot end of the child safety seat which locks with a respective counterpart, e.g., a locking bar that is located in a recess 210 of the lower seat portion of the vehicle seat 102. It has to be noted that typically, besides the ISOFIX connectors 104, only a single locking mechanism 106 either at the foot end or at the backrest of the child safety seat may be required and used. Therefore, any explanations given with respect to the combination of two locking mechanisms 106 also holds in case only a single locking mechanism 106 is used.

The locking mechanism 106 at the foot end of the child safety seat is mounted to the seat base 108 through an elongate component 202 pointing downwards from the seat surface 101. The elongate component 202 is pivoted to the supporting base 108 using an axis 206. An operating button 204 is provided on the elongate component 202, which permits adjustment of the length of the elongate component, i.e., to move the locking mechanism 106 up and down in direction 208. By means of the movement, the locking mechanism 106 can be moved relative to the lower seating portion of the vehicle seat 102 in order to smoothly slide into the recess 210.

The locking mechanism 106 may also be pivoted via a respective axis 200 to the elongate component 202, and optionally the locking mechanism 106 is adjustable in length in direction 212.

Similar to the height adjustability of the locking mechanism 106 at the foot end of the child safety seat 100, the locking mechanism 106 mounted either at the backrest 111 or, in the example of FIG. 2, mounted at the rebound bar 500, may also be adjustable in height relative to the seating surface 101. For this purpose, the locking mechanism 106 is mounted to the backrest 111 or the rebound bar 500 through a coupling member 202. The coupling member 202 is denoted with the same reference numeral as the elongate component 202 since they both make use of the same principle, namely an adjustability of the height of the locking mechanism with respect to the seating surface 101. Consequently, the same principles apply for the coupling member 202 as discussed before with respect to the elongate component 202. For example, the locking mechanism 106 may be pivoted to the coupling member 202 by an axis 200, and the coupling member 202 may comprise a means (not shown in FIG. 2) to adjust and fix the height of the locking mechanism 106.

Further, in FIG. 2, the upper locking mechanism 106 is not length adjustable but only height adjustable and therefore directly pivoted via the axis 200 to the coupling member 202.

FIG. 3 is a perspective view of the child safety seat 100 of FIG. 2. As can be seen from FIG. 3, the lower portion of the elongate component 202, which has mounted the locking mechanism 106, comprises a release button 110 adapted for releasing the locking of the locking mechanism 106 when actuated. For example, the locking mechanism 106 comprises a hook trap that is schematically shown in FIG. 4 and denoted by reference numeral 406. The hook trap may engage with a counterpart element, e.g., an axis or bar 302 as shown in FIG. 3. When moving the locking mechanism 106 into the recess 210, the inclined front surface of the hook trap 406 slides over the axis 302 and is thereby lifted up. At a certain point, the inclined front portion of the hook trap 406 has fully passed over the axis 302 and then falls gravity- or spring-driven to the bottom and locks the locking mechanism 106 with the axis 302. In order to release the locking mechanism 106, the release button 110 may be pressed or pulled, thus lifting up again the hook trap 406 and disengaging the hook trap from the axis 302. Upon disengagement, the locking mechanism 106 may be pulled out of the recess 210 again.

It has to be noted here that even though in FIGS. 2 and 3 both a height-adjustable elongate component 202 and a length-adjustable locking mechanism 106 are depicted, it does not necessarily mean that in practice both components are required. It may be sufficient to only have the height adjustability or to have the length adjustability.

Further shown in FIG. 3 is a release button 300 that is comprised or contained in a sidewall of the backrest 111 in order to be easily accessible for operation by a user. The release button 300 may be used to operate the locking mechanism 106 attached to the backrest 111 or the rebound bar 500. In case the inclination of the rebound bar 500 with respect to the seating surface 101 may be adjustable (movement of the rebound bar 500 around an axis 304), the release button 300 may also be used to releasably fix the rebound bar 500 in a dedicated position with respect to the seating surface 101.

FIG. 4 depicts a schematic view of a locking mechanism 106 that may be secured to the child safety seat via a guiderail 400. The guiderail is adjustable in length. For example, the length adjustability is given by a telescopic setup of the guiderail 400 comprising a first rail 402 and a second rail 404 engaging each other, wherein the first rail 402 may be attached to the seat, e.g., via the optional coupling member 202 or the elongate component 202, and wherein the locking mechanism 106 is pivoted to the second rail 404, e.g., via the axis 200. The two rails 402 and 404 comprise multiple opposing latching elements, and a respective release button not depicted in FIG. 4 may be used to fix the latching between the two rails in a desired position.

FIG. 5 depicts a child safety seat 100 in a rearward-facing direction; i.e., a child or infant sitting in the seat is facing the backrest 102 of the vehicle seat on which the child safety seat 100 is installed. The child safety seat may be installed, e.g., using ISOFIX connectors 104, wherein here the same principles apply as already discussed above with respect to FIGS. 1-3. Further, the child safety seat is secured to the vehicle seat 102 via a locking mechanism 106 that is received in a recess 112 of the backrest of the vehicle seat 102. A rebound bar 500 may be provided at the foot end of the child safety seat 100. For example, the rebound bar is pivoted to the seat base 108 via an axis 304, wherein the angle between the seat surface 101 of the child safety seat and the rebound bar 500 may be adjusted and locked using respective locking means. The purpose of the rebound bar 500 is to avoid a rebound of the seat shell in direction 502 in case of a crash of the vehicle when the vehicle moves in direction 506 and suddenly stops.

Regarding the mounting of the locking mechanism 106 to the rebound bar 500, the same principles apply as already discussed above with respect to FIGS. 1-3.

FIG. 6 is a perspective view of the child safety seat of FIG. 5. In addition to what can be seen in FIG. 5, a release button 600 is visible which is integrated in the rebound bar 500. The release button 600 may comprise a child lock adapted to prevent an operation of this release button 600 by a child who is facing the release button 600.

Regarding the rebound bar 500, various options are possible and freely combinable. One option is that the rebound bar is rotatable about the axis 304, as discussed above. Another option is that the rebound bar is adjustable in height, i.e., that the upper portion of the rebound bar is moveable up and down in direction 208. The release button 600 may also be used to lock the height of the upper portion of the rebound bar 500 which carries the locking mechanism 106 in place. Further, the release button 600 may unlock the locking mechanism 106 to disengage the locking mechanism 106 from the respective counterpart of the vehicle seat 102. Finally, the release button 600 may be used to lock the rebound bar 500 in its rotational orientation regarding the movement around the axis 304 with respect to the seating surface 101.

FIG. 7 shows a schematic of a child safety seat 100 which is also installed in a rearward-facing direction on the vehicle seat 102. Instead of the locking mechanism 106 being integrated in the rebound bar 500, the locking mechanism 106 is integrated in the supporting base 108. Here, the same principles apply as already discussed with respect to the locking mechanism 106 that was previously discussed in FIG. 2.

FIG. 8 is a perspective view of the child safety seat of FIG. 7, where additionally the release button 110 is visible that may be used to release the locking mechanism from engagement with the respective counterpart in the vehicle seat 102. Here, the same principles apply as already discussed above with respect to FIG. 3.

While in FIGS. 7 and 8 the locking mechanism was only provided on the supporting base, additionally in FIG. 9 a further locking mechanism is provided in the rebound bar 500. This locking mechanism in the rebound bar 500 was described above with respect to FIGS. 5 and 6.

It has to be noted that it is generally preferable that the locking mechanism 106 in any of the above-described examples be centered with respect to the width of the child safety seat 100, i.e., either centered with respect to the width of the rebound bar 500, centered with respect to the width of the backrest 111 or centered with respect to the width of the supporting base 108. In the event of a frontal impact, this leads to a symmetrical distribution of the forces occurring, so that any unilateral lever forces and thus potentially seat-damaging force peaks are avoided.

LIST OF REFERENCE NUMERALS 100 child safety seat
101 seat surface
102 vehicle seat
104 locking mechanism
106 locking mechanism
108 seat base
110 release button
111 back rest
112 recess
114 line/frictional axis
200 axis
202 elongate component
204 button
206 axis
208 direction
210 recess
212 direction
300 release button
302 axis
304 axis
400 guide rail
402 first rail
404 second rail
406 hook
500 rebound bar
502 direction
506 direction
600 release button

The invention claimed is:

1. A child safety seat comprising:
at least a first, a second and a third locking mechanism each being adapted for releasably locking the seat to a vehicle at a respective anchorage point, wherein the anchorage points of the first locking mechanism and the second locking mechanism are arranged on a line, the anchorage point of the third locking mechanism being spaced apart from the line,
a seat surface of the seat, the seat surface providing a sitting area of the seat, the third locking mechanism being adjustable in height relative to the seat surface, and
a coupling member, the third locking mechanism being secured to the seat via the coupling member, a length of the coupling member being adjustable to enable the height adjustability of the third locking mechanism, and wherein the third locking mechanism is pivoted to the coupling member.

2. The child safety seat of claim 1, the anchorage point of the third locking mechanism being centered with respect to the width of the seat.

3. The child safety seat of claim 1, wherein the line runs below the seat surface.

4. The child safety seat of claim 1, further comprising a back rest and a supporting base, the supporting base supporting the seat surface, the supporting base or the back rest comprising the third locking mechanism.

5. The child safety seat of claim 1, wherein the third locking mechanism is adapted for enabling the releasable locking to the vehicle in a functioning position of the third locking mechanism, wherein the third locking mechanism can be pivoted between the functioning position and a resting position, wherein in the resting position the third locking mechanism is received in a shell of the seat.

6. The child safety seat of claim 1, further comprising a supporting base supporting the seat surface, wherein the coupling member is an elongate component pointing downwards from the seat surface, and wherein the elongate component is pivoted to the supporting base.

7. The child safety seat of claim 1, further comprising a supporting base supporting the seat surface, wherein the seat further comprises a guide rail, the third locking mechanism being secured to the seat via the guide rail, the guide rail being adjustable in length, wherein due to the adjustability in length
the spacing between the back rest and the anchorage point of the third locking mechanism is adjustable when the back rest comprises the third locking mechanism, or
the spacing between the back rest and the anchorage point of the third locking mechanism is adjustable when the supporting base comprises the third locking mechanism.

8. The child safety seat of claim 7, wherein the guide rail comprises a telescopic rail, wherein the telescopic rail comprises a first and a second rail engaging each other, the first rail being attached to the seat and the third locking mechanism being pivoted to the second rail, the first and the second rail comprising multiple opposing latching elements.

9. The child safety seat claim 8, wherein the third locking mechanism is pivoted to the guide rail.

10. The child safety seat of claim 1, wherein third locking mechanism comprises a hook trap for the releasably locking of the seat.

11. The child safety seat of claim 1, further comprising a release button adapted for releasing the locking of the third locking mechanism when being actuated.

12. The child safety seat of claim 11, further comprising a back rest, wherein the back rest comprises the release button.

13. The child safety seat of claim 11, further comprising a supporting base supporting the seat surface and a rebound bar arranged at the supporting base, a foot end or a head end of the seat, the rebound bar being adapted for being fixed rigidly to the seat and for forming an abutment with respect to the vehicle above the seat surface, the rebound bar comprising the third locking mechanism and/or the release button.

14. The child safety seat of claim 13, the rebound bar being arranged on the seat so as to be rotatable about an axis and being releasably fixable in a plurality of positions, wherein more particularly the release button further adapted to release the fixing of the rebound bar when being actuated.

15. The child safety seat of claim 13, the release button having a child lock adapted to prevent operation of the release button by an infant.

16. The child safety seat of claim 11, wherein the coupling member comprises the release button, the release button being arranged on the coupling member for being operable from the side of the coupling member facing away from the line.

17. A system comprising a vehicle and a child safety seat, the child safety seat comprising:
at least a first, a second and a third locking mechanism each being adapted for releasably locking the seat to the vehicle at a respective anchorage point, wherein the anchorage points of the first locking mechanism and the second locking mechanism are arranged on a line, the anchorage point of the third locking mechanism being spaced apart from the line,
a seat surface of the seat, the seat surface providing a sitting area of the seat, the third locking mechanism being adjustable in height relative to the seat surface, and
a coupling member, the third locking mechanism being secured to the seat via the coupling member, a length of the coupling member being adjustable to enable the height adjustability of the third locking mechanism, and wherein the third locking mechanism is pivoted to the coupling member.

18. A child safety seat comprising:
at least a first, a second and a third locking mechanism each being adapted for releasably locking the seat to a vehicle at a respective anchorage point, wherein the anchorage points of the first locking mechanism and the second locking mechanism are arranged on a line, the anchorage point of the third locking mechanism being spaced apart from the line;
a seat surface of the seat, the seat surface providing a sitting area of the seat, the third locking mechanism being adjustable in height relative to the seat surface;
a supporting base supporting the seat surface;
a guide rail; and
a coupling member, the third locking mechanism being secured to the seat via the coupling member and the guide rail, the coupling member being height adjustable to enable the height adjustability of the third locking mechanism, wherein the guide rail comprises a telescopic rail, wherein the telescopic rail comprises a first and a second rail engaging each other, the first rail being attached to the seat and the third locking mechanism being pivoted to the second rail, the first and the second rail comprising multiple opposing latching elements, and wherein the guide rail is adjustable in length such that
the spacing between the back rest and the anchorage point of the third locking mechanism is adjustable when the back rest comprises the third locking mechanism, or
the spacing between the back rest and the anchorage point of the third locking mechanism is adjustable when the supporting base comprises the third locking mechanism.

19. A child safety seat comprising:
at least a first, a second and a third locking mechanism each being adapted for releasably locking the seat to a vehicle at a respective anchorage point, wherein the anchorage points of the first locking mechanism and the second locking mechanism are arranged on a line, the anchorage point of the third locking mechanism being spaced apart from the line;
a seat surface of the seat, the seat surface providing a sitting area of the seat, the third locking mechanism being adjustable in height relative to the seat surface;
a supporting base supporting the seat surface;
a release button adapted for releasing the locking of the third locking mechanism when being actuated;
a rebound bar arranged at the supporting base, a foot end or a head end of the seat, the rebound bar being adapted for being fixed rigidly to the seat and for forming an abutment with respect to the vehicle above the seat surface, the rebound bar comprising the third locking mechanism and/or the release button, the rebound bar being arranged on the seat so as to be rotatable about an axis and being releasably fixable in a plurality of positions, wherein the release button is further adapted to release the fixing of the rebound bar when actuated; and
a coupling member, the third locking mechanism being secured to the seat via the coupling member, the coupling member being height adjustable to enable the height adjustability of the third locking mechanism.

* * * * *